United States Patent
Cha et al.

(10) Patent No.: US 10,120,536 B2
(45) Date of Patent: Nov. 6, 2018

(54) MONITORING METHOD

(71) Applicant: HANWHA TECHWIN CO., LTD., Changwon-si (KR)

(72) Inventors: Yoomi Cha, Changwon-si (KR); Dongwon Kim, Changwon-si (KR); Jongjoon Baik, Changwon-si (KR); JooBok Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 235 days.

(21) Appl. No.: 14/503,627

(22) Filed: Oct. 1, 2014

(65) Prior Publication Data

US 2015/0106721 A1 Apr. 16, 2015

(30) Foreign Application Priority Data

Oct. 14, 2013 (KR) .......................... 10-2013-0122217

(51) Int. Cl.
*G06F 3/0483* (2013.01)
*G08B 13/196* (2006.01)
*H04N 7/18* (2006.01)

(52) U.S. Cl.
CPC ..... *G06F 3/0483* (2013.01); *G08B 13/19682* (2013.01); *G08B 13/19693* (2013.01); *H04N 7/183* (2013.01)

(58) Field of Classification Search
CPC ............. G06F 3/0483; G08B 13/19682; G08B 13/19693; H04N 7/183
USPC ........................................................ 715/721
See application file for complete search history.

(56) References Cited

U.S. PATENT DOCUMENTS

| | | | |
|---|---|---|---|
| 6,674,955 B2 | 1/2004 | Matsui et al. | |
| 7,716,194 B2 | 5/2010 | Williams et al. | |
| 2006/0279630 A1* | 12/2006 | Aggarwal | G01S 3/7864 348/143 |
| 2009/0089294 A1* | 4/2009 | Davis | H04N 7/17318 |
| 2009/0132921 A1* | 5/2009 | Hwangbo | G06F 3/0482 715/716 |
| 2009/0134968 A1* | 5/2009 | Girgensohn | G06K 9/00771 340/3.1 |
| 2009/0225164 A1* | 9/2009 | Renkis | G08B 13/19656 348/143 |

(Continued)

FOREIGN PATENT DOCUMENTS

| | | |
|---|---|---|
| EP | 1578130 A1 | 9/2005 |
| KR | 10-2006-0082392 A | 7/2006 |
| KR | 10-0603173 B1 | 12/2006 |

*Primary Examiner* — Roland J Casillas
(74) *Attorney, Agent, or Firm* — Sughrue Mion, PLLC

(57) ABSTRACT

Disclosed are a monitoring method and a system that display a log icon including event-related information to facilitate an intuitive confirmation of event information. The monitoring method includes: receiving a plurality of images from a plurality of image devices; displaying the images in a first region of a display; displaying information about the image devices related to the images, which are being displayed in the first region, in a second region of the display which is different from the first region; and generating a plurality of log icons including event information when a predetermined event is detected from the images which are being displayed in the first region; and displaying the log icons in a third region of the display which is different from the first and second regions.

17 Claims, 6 Drawing Sheets

(56) References Cited

U.S. PATENT DOCUMENTS

| | | | | |
|---|---|---|---|---|
| 2011/0090347 A1* | 4/2011 | Buckner | ................ | H04H 20/18 |
| | | | | 348/207.1 |
| 2012/0194336 A1* | 8/2012 | Thiruvengada | .. | G08B 13/19645 |
| | | | | 340/525 |
| 2012/0323891 A1* | 12/2012 | Jacobson | ............... | G06Q 30/02 |
| | | | | 707/722 |
| 2013/0007626 A1* | 1/2013 | Adams | ................... | G07C 5/008 |
| | | | | 715/738 |
| 2013/0091432 A1* | 4/2013 | Shet | ................ | G08B 13/19645 |
| | | | | 715/719 |

* cited by examiner

MONITORING METHOD

CROSS-REFERENCE TO THE RELATED APPLICATION

This application claims priority from Korean Patent Application No. 10-2013-0122217, filed on Oct. 14, 2013, in the Korean Intellectual Property Office, the disclosure of which is incorporated herein in its entirety by reference.

BACKGROUND

1. Field

Methods and apparatuses consistent with exemplary embodiments relate to a monitoring method, and more particularly, to a monitoring method that displays a log icon including event-related information.

2. Description of the Related Art

A monitoring system monitors a specific place by using a plurality of monitoring units, and when an abnormal situation is identified, the monitoring system enables an action against the abnormal situation or recognition after the abnormal situation. The monitoring system is actively applied to buildings, industrial sites, places for selling or storing things, places for handling expensive goods, multiple apartments, private houses, etc.

The monitoring system performs a monitoring function in interoperation with an application called a central monitoring system (CMS). The CMS displays images respectively captured by a plurality of monitoring units, and when a specific event is detected from the images respectively captured by the plurality of monitoring units, the CMS displays the specific event as text log information, thereby enabling a manager to recognize the specific event.

However, when an event is detected from images which are respectively captured by a plurality of monitoring units and displayed, it is difficult to obtain information about the event at a glance by using text log information, and the moment of the occurrence of the event can be missed. That is, security efficiency is changed depending on a personal competence of a manager, and it is difficult to immediately determine a condition.

SUMMARY

Exemplary embodiments of the inventive concept provide a monitoring method and a system that display a log icon including event-related information to facilitate the intuitive confirmation of event information.

Various exemplary embodiments will be set forth in part in the description which follows and, in part, will be apparent from the description, or may be learned by practice of the presented embodiments.

According to an aspect of an exemplary embodiment, there is provided a monitoring method which may include: receiving a plurality of images from a plurality of image devices; displaying the images in a first region of a display; displaying information about the image devices related to the images, which are being displayed in the first region, in a second region of the display which is different from the first region; and generating a plurality of log icons including event information when a predetermined event is detected from the images which are being displayed in the first region; and displaying the log icons in a third region of the display which is different from the first and second regions.

Each of the log icons may include a thumbnail image at a time when the event occurs, a type of the event, and text information about the event.

The monitoring method may further include: displaying at least one search tab, in which a search condition is set, near the third region; and in response to selection of a search tab among the at least one search tab, displaying at least one log icon corresponding to the search condition which is set in the selected search tab.

The monitoring method may further include: displaying a timeline in the display; and in response to selection of a time section from the timeline, displaying at least one log icon corresponding to the selected time section.

The monitoring method may further include, in response to selection of a log icon, from among the at least one log icon, corresponding to the selected time section, activating the selected log icon, and deactivating the rest of the at least one log icon.

The monitoring method may further include, in response to selection of a log icon, from among the at least one log icon, corresponding to the selected time section, activating the selected log icon, and deactivating the rest of the at least one log icon.

According to an aspect of another exemplary embodiment, there is provided a monitoring method which may include: detecting occurrence of at least one event from a plurality of images received from a plurality of image devices; generating, from the images, a thumbnail image and an event image corresponding to a time of the occurrence of each of the event; generating a log icon which includes the thumbnail image and event information corresponding to each of the event; and displaying a log list including the log icon corresponding to each of the event in a region of a display in real time.

The event information may include a type of the event and text information about the event.

The monitoring method may further include, in response to selection of a log icon from among a plurality of log icons in the log list, activating an event image matching a thumbnail image of the selected log icon, and deactivating unselected log icons.

The monitoring method may further include: displaying a condition search tab in the display; in response to selection of the condition search tab, displaying a menu which includes at least one search condition to be selected; and in response to selection of one of the at least one search condition, displaying a log list including at least one log icon corresponding to the selected search condition, wherein the at least one log icon includes a thumbnail image and information about an event.

The search condition may include at least one of a place of the event, a type of the event, and a plurality of devices providing the plurality of images corresponding to respective events.

The monitoring method may further include: displaying a timeline in the display; and in response to selection of a time section from the timeline, displaying at least one log icon corresponding to the selected time section.

The monitoring method may further include, in response to selection of a log icon from among the at least one log icon corresponding to the selected time section, activating an event image matching a thumbnail image of the selected log icon about an event, and deactivating the rest of the at least one log icon.

The monitoring method may further include, if a number of the at least one log icon corresponding to the selected time section is more than a maximum number of log icons that can be displayed in the display, indicating a number of log icons that exceeds the maximum number in the display.

According to an aspect of an exemplary embodiment, a monitoring system may include: a controller configured to detect occurrence of at least one event from a plurality of images, generate, from the plurality of images, a thumbnail image and an event image at a time of the event occurrence, and generate a log icon which includes the thumbnail image and information about the event; and a display configured to display a log list including a plurality of log icons including the log icon in real time.

The event information may include a type of the event and text information about the event.

In response to selection of a log icon from among the plurality of log icons, the controller activates an event image matching a thumbnail image of the selected log icon and deactivates the rest of the log icons in the display.

The display unit may display a condition search tab. In response to selection of the condition search tab, the controller may control the display to display a menu which includes at least one search condition to be selected. In response to selection of one of the at least one search condition, the controller may control the display to display a log list including at least one log icon corresponding to the selected search condition.

The display unit may display a timeline. In response to selection of a time section from the timeline, the controller may control the display to display at least one log icon corresponding to the selected time section.

If a number of the at least one log icon corresponding to the selected time section is more than a maximum number of log icons that can be accommodated in the display, the control unit indicates a number of log icons that exceeds the maximum number in the display.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
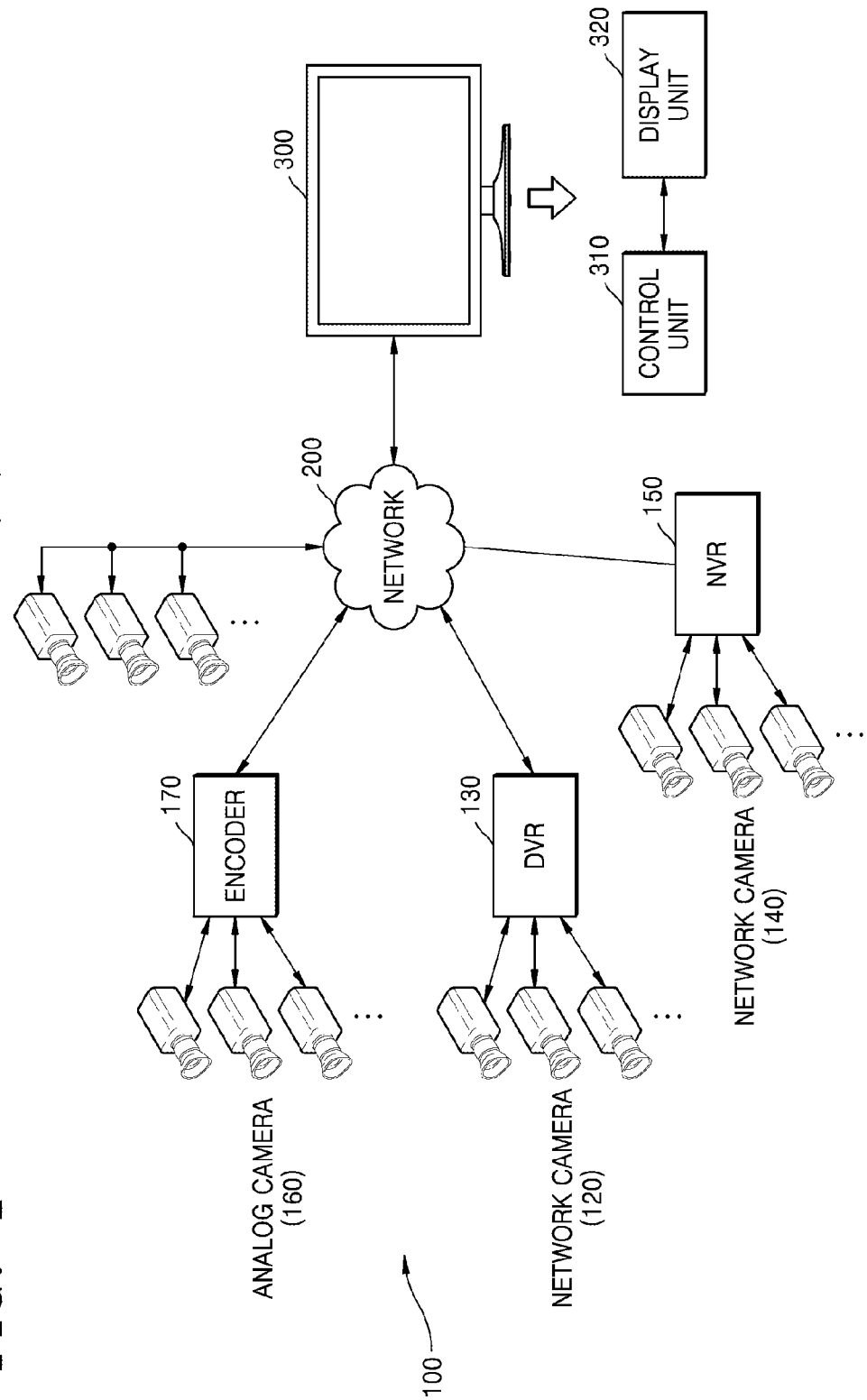
FIG. 1 is a diagram illustrating a configuration of a monitoring system according to an exemplary embodiment.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain various aspects of the inventive concept.

Since the inventive concept may have diverse modified embodiments, selected embodiments are described herebelow in reference to the drawings. However, this does not limit the inventive concept within these embodiments and it should be understood that the inventive concept covers all the modifications, equivalents, and replacements within the idea and technical scope of the inventive concept. Moreover, detailed descriptions related to well-known functions or configurations will be omitted in order not to unnecessarily obscure subject matters of the embodiments.

It will be understood that although the terms of first and second are used herein to describe various elements, these elements should not be limited by these terms. Terms are only used to distinguish one component from other components.

In the following description, the technical terms are used only for explain a specific exemplary embodiment while not limiting the inventive concept. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

The inventive concept may be embodied as functional blocks and various processing operations. The functional blocks may be implemented with various hardware and/or software configurations executing specific functions. For example, the exemplary embodiment employ integrated circuit configurations such as a memory, processing, logic, a look-up table and the like capable of executing various functions upon control of microprocessors or other control devices. In a similar manner to that in which the elements of the exemplary embodiment may be executed with software programming or software elements, the inventive concept may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the exemplary embodiments may employ conversional arts to establish an electronic environment, process signals and/or process data. The terms "mechanism", "element", "means" and "configuration" may be widely used and are not limited to mechanical and physical configurations. Such terms may have the meaning of a series of routines of software in association with a processor or the like.

Hereinafter, exemplary embodiments of the inventive concept will be described in detail with reference to the accompanying drawings. Like reference numerals in the drawings denote like elements, and thus their descriptions will not be repeated.

FIG. 1 is a diagram illustrating a configuration of a monitoring system according to an exemplary embodiment.

Referring to FIG. 1, the monitoring system includes image devices 100 associated with capturing of one or more images, a network 200, and central management equipment 300 which includes a controller 310 and a display 320. In the present embodiment, the device 100 is connected to the central management equipment 300 over the network 200.

The image devices 100 may include at least one first network camera 110 that captures an image, at least one second network camera 120 that captures an image, a digital video recorder (DVR) 130 that stores an image captured by the second network camera 120, at least one third network camera 140 that captures an image, a network video recorder (NVR) 150 that stores an image captured by the third network camera 140, at least one analog camera 160 that captures an image, and an encoder 170 that encodes an image captured by the analog camera 160. Here, the device 100 is not limited to the above-described details, and may include any devices that are connected to the network 200 and transmit an image to the central management equipment 300.

The image devices 100 may transmit images captured by the first network camera 110, images stored in the DVR 130, images stored in the NVR 150, and encoded images output from the encoder 170, to the central management equipment 300 over the network 200.

The central management equipment 300 displays images which are received from the image devices 100 over the network 200, and when an event is detected from the displayed images, the central management equipment 300 displays log icons including information about the event. The controller 310 controls an operation of the central management equipment 300, and displays control details in the display 320.

According to an exemplary embodiment, the controller 310 may sense (detect) occurrence of an event from the images which are received from the image devices 100 over the network 200, or receive images, including an image in which an event is detected, from the image devices 100. In order for the controller 310 to detect an event, the controller 310 may include an image analyzer (not shown). The controller 310 analyzes an image received from the image devices 100, and when a predetermined event condition is satisfied, the controller 310 recognizes occurrence of an event. Here, when the event condition is satisfied through image analysis such as disappearance or appearance of an object in a screen, a trace of an image of a target similar to a specific image preset by a user, sensing of a movement of an object, and a turn-off of an image, the controller 310 recognizes occurrence of an event. Furthermore, the controller 310 analyzes a sound source included in an image signal, and when an event condition with respect to a sound source is satisfied, the controller 310 recognizes occurrence of an event. Here, when a level of the sound source is equal to or higher than a threshold value predetermined by a user or the sound source is the same as a sound source preset by a user, the controller 310 recognizes occurrence of an event. Furthermore, a database of several abnormal sound sources is built. The controller 310 compares the analyzed sound source with the sound sources stored in the database (not shown), and when there is a match therebetween, the controller 310 may recognize occurrence of an event. In an image, the event condition used to analyze the image may include a case where an object appears, a case where an image (for example, appearance of a face unable to recognize) preset by a user is generated, a case where a screen color is changed, and a case where a motion occurs in a predetermined region, and may be preset. An event condition used to analyze a sound source may include a case where an abnormal sound source (stridulation (skid) of a car tire, a sound of breaking glass, an alarm sound, a collision sound, etc.) occurs, a case where a sound source (for example, a scream of a human, crying of a baby, etc.) preset by a user, and a case where a voice equal to or greater than a threshold value occurs, and may be preset.

Figure 2:
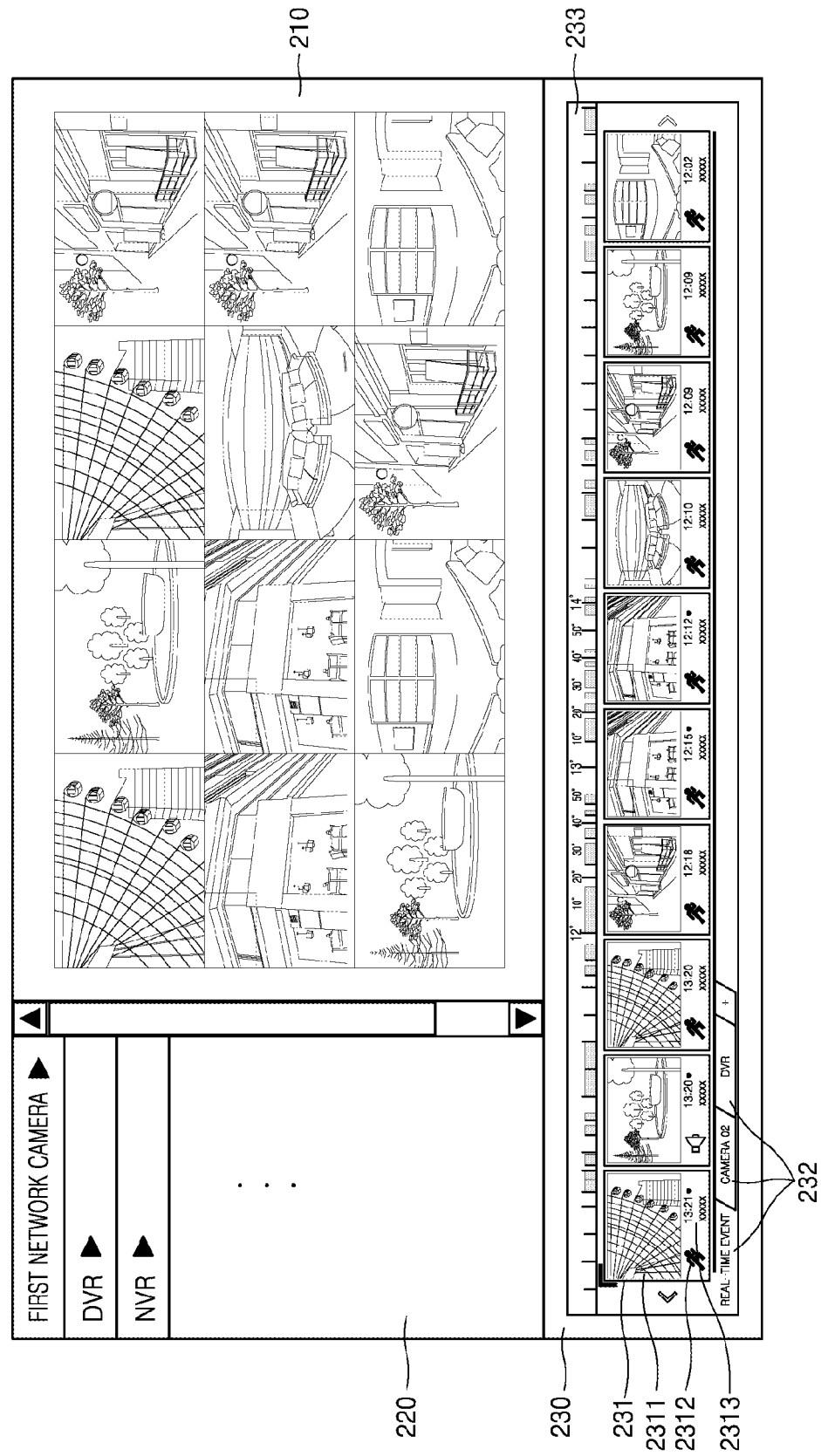
FIG. 2 is a diagram illustrating an interface screen of a central management system of FIG. 1 according to an exemplary embodiment.

The controller 310 divides the display unit 320 into three regions, and displays different information in the three regions. FIG. 2 is a diagram illustrating an interface screen of the central management equipment 300 displayed by the display 320 according to an exemplary embodiment.

The controller 310 displays images, received from at least one the image devices 100, in a first region 210 of the display 320. In FIG. 2, the first region 210 of the display 320 simultaneously displays, in real time, images received twelve image devices 100 through twelve channels, but the present embodiment is not limited thereto. For example, only an image through one channel may be displayed on an entire screen of the display 320, or a number of images through four channels, fifty-four channels, etc. may be displayed on the entire screen. Also, the controller 310 displays information (type, presence of connection, etc.) about the image devices 100 related to the displayed images, in a second region 220 of the display 320 which is different from the first region 210. For example, the second region 220 displays information about the first network camera 110, the DVR 130, the NVR 150, and the encoder 170 related to the images which are being currently displayed.

Furthermore, when an event occurs and detected from images which are being displayed in the first region 210, the controller 310 displays a log list, which includes a plurality of log icons 231 including information about the event, in a third region 230 of the display 320 which is different from the first and second regions 210 and 220. When an event occurs and detected from an image, the controller 310 may generate a thumbnail image and an event image at a time when the event occurs and is detected from the original image. The thumbnail image is a small-size still image which is generated by down-sampling an image at the time when the event is generated. The event image is an image for a certain time (for example, 5 seconds before and after) before and after the time when the event occurs. The controller 310 may match the thumbnail image with the event image, and store the matched thumbnail image and event image in a storage device such as a memory (not shown).

Here, each of the log icons 231 includes a thumbnail image at a time when an event occurs, the type of the event, and text information (an event occurrence position, an event occurrence time, and a type of device) about the event. To provide a description with the log icon 231 (displayed in the third region 230) as an example, the log icon 231 includes a thumbnail image 2311 at a time when the event occurs, a type 2312 of the event indicating sensing of a motion, and text information 2313 about the event.

According to an exemplary embodiment, the third region 230 displays a log list in which a plurality of log icons are listed in one row. When a plurality of events simultaneously occur in a plurality of channels, the controller 310 may generate and display a plurality of log icons on one row in a predetermined order. When a log icon among the plurality of log icons is selected (clicked), an event image matched with a thumbnail image of the selected log icon may be activated and displayed in a reproducible state (e.g., FIG. 4A). The matched event image, e.g., a moving image, may be displayed in the third region 230 while the plurality of log icons are deactivated.

Examples of an event may include a sensor event generated from a signal sensed by a sensor (not shown) included in the image devices 100, an audio event generated from an arbitrary sound source, and a motion sensing event. The type of an event may be indicated as a certain symbol (for example, a speaker indicating the audio event, a human shape indicating the motion sensing event, or the like). As described above, event information is intuitively confirmed by displaying a log icon which includes a thumbnail image at a time when an event occurs, the type of the event, and text information about the event.

In the third region 230, a timeline 233 may be provided at an upper end of a log list, and at least one search tab 232 may be provided at a lower end of the log list.

Figure 3A:
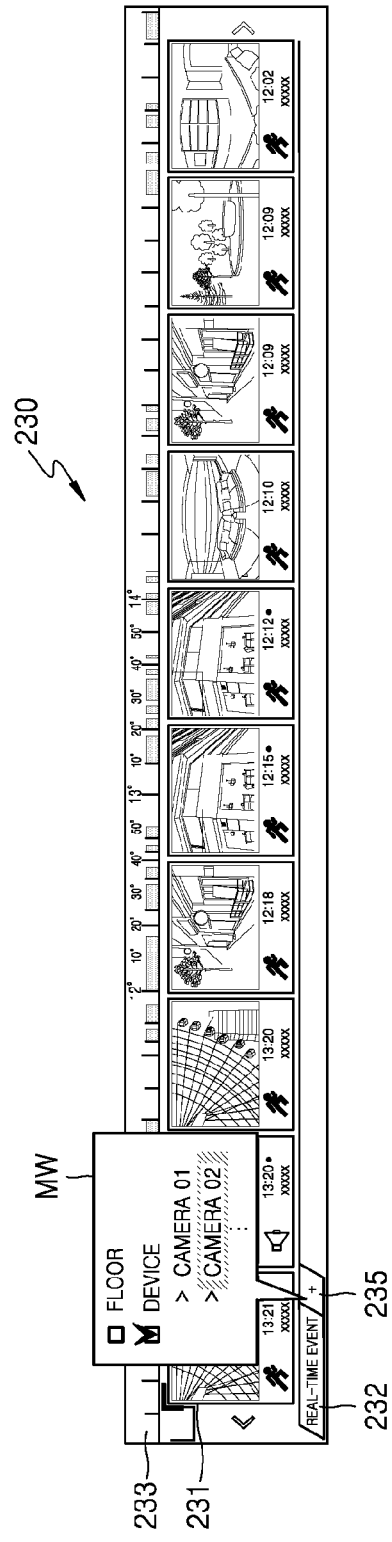
FIGS. 3A-3B illustrate diagrams for describing display of a log icon based on selection of a search tab in the interface screen of FIG. 2, according to an exemplary embodiment.
Figure 3B:
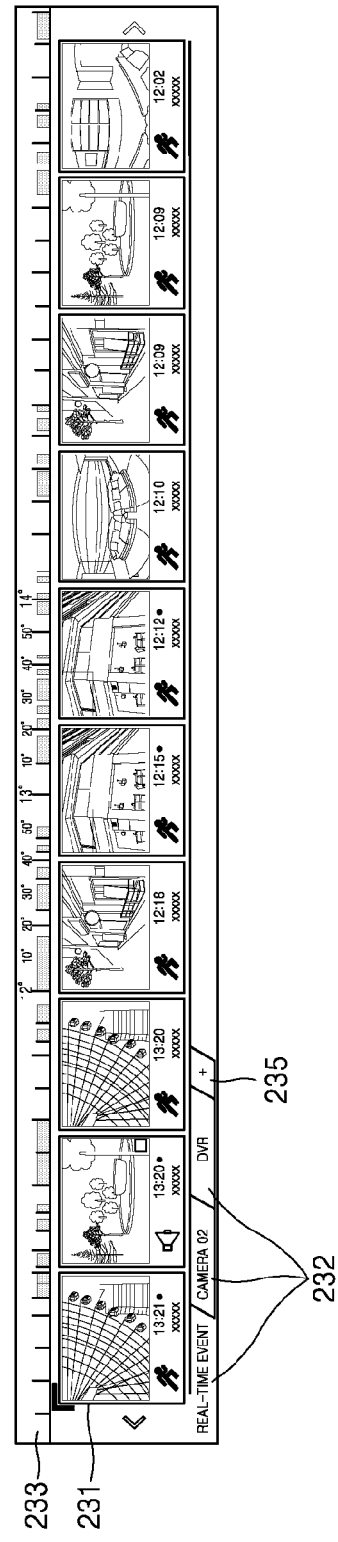

FIGS. 3A and 3B illustrate diagrams for describing display of log icons based on selection of a search tab in the third region 230 of the interface screen of the central management equipment 300 displayed in the display 320.

Referring to FIG. 3A, the controller 310 may display, at a lower end of a log list, a real-time event tab 232, which is a default search tab, and a condition search tab 235 illustrated as "+". When the condition search tab 235 is selected (clicked) by a mouse pointing or a finger touch (in case of a touch screen), the controller 310 may provide a menu MW for selecting at least one of search conditions. The search conditions may include a place, the type of an event, and a plurality of devices. For example, the controller 310 may hierarchize search conditions such as devices by floor in a building, devices by position (for example, a gate, stair, etc.) in the building, and the type of an event, and provide the hierarchized search conditions as the menu MW. A user may select at least one search condition from the menu MW. For example, the manager may select a camera 02 installed in a building gate from among the first network cameras 110, and allow only an event, which occurs in an image captured by the camera 02, to be displayed in the log list. The search conditions are not limited to the above-described example, and may be variously set.

FIG. 3B illustrates an example in which a plurality of search tabs 232 generated by the controller 310 are sequentially displayed. When one of the plurality of search tabs 232 is selected, the controller 310 displays, in the log list, at least one log icon corresponding to a search condition which is set in the selected search tab. For example, when a "real-time event" tab is selected from the search tabs 232, the controller 310 displays, in real time, the log icons 231 for images from the image devices 100 which is connected to the central management equipment 300 over the network 200. Also, when a "camera 02" tab is selected from the search tabs 232, the controller 310 displays at least one log icon 231 for at least one image captured by the camera 02 among the first network cameras 110. Also, when a "DVR" tab is selected from the search tabs 232, the controller 310 displays at least one log icon 231 for at least one image transmitted from the DVR 130.

That is, according to the present exemplary embodiment, one or more the search tabs 232 may be generated by the condition search tab 235, and thus a search condition may be previously set, and the log icons 231 corresponding to the search condition may be conveniently, quickly sorted and displayed. The search tabs 232 may be removed.

Figures 4A, 4B:
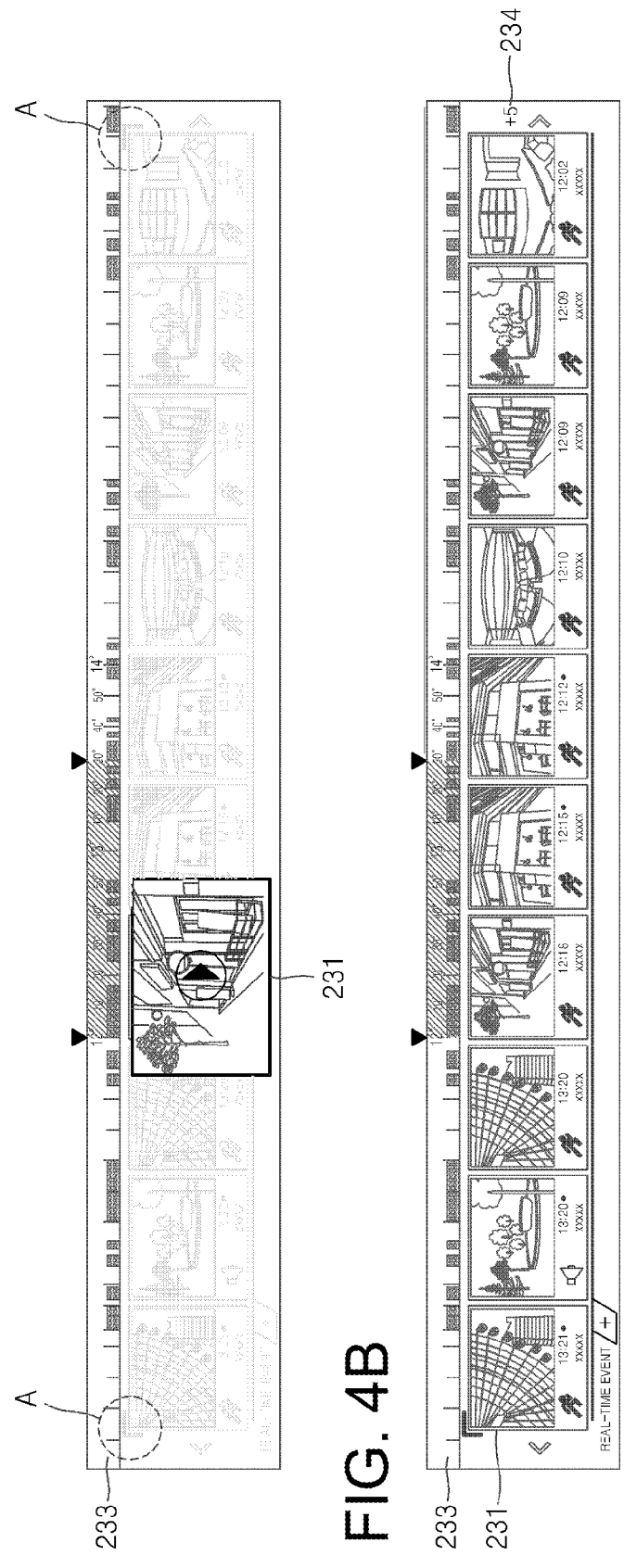
FIGS. 4A-4B illustrate diagrams for describing display of a log icon based on selection of a time section in the interface screen of FIG. 2, according to an exemplary embodiment.

FIGS. 4A and 4B illustrate diagrams for describing display of log icons based on selection of a time section in the third region 230 of the interface screen of the central management equipment 300 displayed in the display 320.

Referring to FIG. 4A, the controller 310 may display a timeline 233 at an upper end of a region in which a log list is displayed. When an event occurs, the controller 310 may display, as a line, occurrence of an event at a position corresponding to a time when the event occurs, in the timeline 233. When a plurality of events simultaneously occur, event display lines may overlap each other. In this case, event display lines are displayed to overlap one another in correspondence with the number of simultaneously occurred events, and thus, a color concentration of a display line is changed depending on the number of simultaneously occurred events. For example, when one-time event occurs at a specific time, a display line may be displayed at a concentration of 10% at a position corresponding to the specific time, and when a plurality of events occur at a specific time, a display line may be displayed at a concentration of 70% at a position corresponding to the specific time. When an event continuously occurs during a certain time section, a display line may be continued and localized, and thus, a display line having a certain width may be displayed.

When one time section is selected from the timeline 233 by a user, the controller 310 displays, as a log list, at least one log icon 231 corresponding to the selected time section in the third region 230. The controller 310 may generate a delimiter A, and provide the delimiter A to an upper end of each of a rightmost log icon and a leftmost log icon among the displayed log icons 231. In the embodiment of FIG. 4A, the delimiter A may be illustrated as "|", but the present embodiment is not limited thereto. For example, various signs for distinguishing time sections may be used. Here, a time section may be selected through dragging an input device (for example, a mouse device) on the timeline 233, or may be directly input.

When a specific log icon 231 is selected from among the displayed log icons 231, the controller 310 activates the selected log icon 231, and deactivates the other unselected log icons 231. The controller 310 may also activate an event image matching a thumbnail image of the selected log icon 231, and display the activated event image in a reproducible state, in the third region 230.

Referring to FIG. 4B, when the number of log icons within a selected time section is more than the number of log icons that can be displayed in the third region 230, the exceeding number of the log icons 231 may be separately displayed. "+5" 234 illustrated at a right end of the log list in FIG. 4B denotes that there are five log icons in addition to the log icons 231 within the selected time section. When the controller 310 receives a corresponding number input signal or receives an arrow key input signal, the controller 310 may display the other five log icons 231 on a next screen, or may remove some of currently displayed log icons 231 from a current screen, and then display the other five log icons 231 on the current screen. According to the exemplary embodiment of FIG. 4B, since the number of log icons exceeds the number of the log icons displayable within the selected time section, the delimiter A is not illustrated on a rightmost log icon, but when the other five log icons 231 are displayed, the delimiter A may be provided on a last rightmost log icon.

Figure 5:
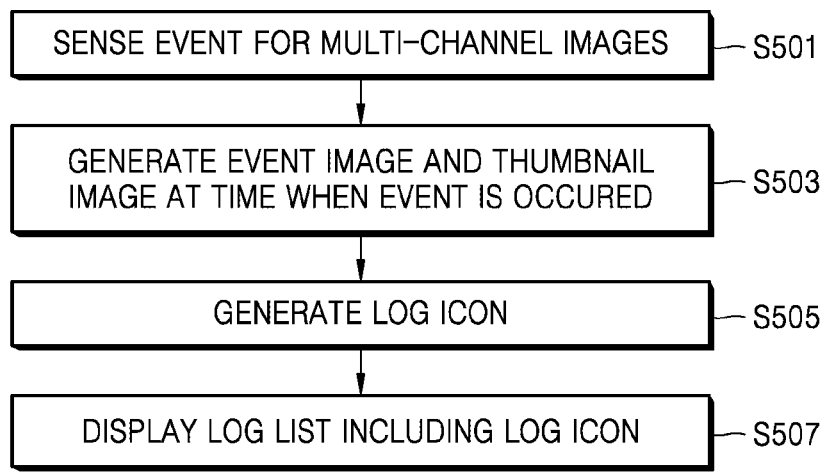
FIG. 5 is a flowchart illustrating a monitoring method according to an exemplary embodiment.

FIG. 5 is a flowchart illustrating a monitoring method according to an exemplary embodiment. The monitoring method according to this embodiment, as illustrated in FIG. 1, may be performed in the central management equipment 300 with the help of peripheral elements. In the following description, the same details as those of FIGS. 1 to 4 are not described.

Referring to FIG. 5, in operation S501, the controller 310 of the central management equipment 300 may sense (detect) the occurrence of an event for multi-channel images input from a plurality of channels. In operation S503, when the occurrence of the event is detected from the multi-channel images, the controller 310 may generate a thumbnail image and an event image at a time when the event occurs. In operation S505, the controller 310 may generate a log icon which includes the thumbnail image and the event information.

In operation S507, the controller 310 may display the generated log icon in the display 320 in real time, and thus display a log list including a plurality of log icons in the display 320 in real time. The log list is log information in which a plurality of log lists generated for the multi-channel images are listed in one row according to a predetermined arrangement condition (for example, a time order, a device order, etc.).

When a log icon is selected from among the plurality of log icons, the controller 310 may activate an event image matching a thumbnail image of the selected log icon, display the activated event image in a reproducible state, and deactivate unselected log icons.

Figure 6:
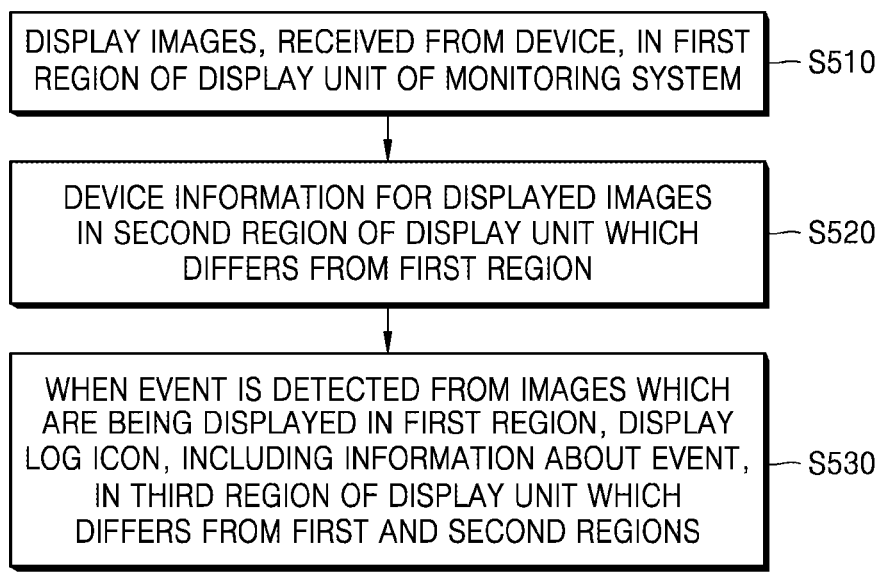
FIG. 6 is a flowchart illustrating a display method for monitoring according to an exemplary embodiment.

FIG. 6 is a flowchart illustrating a display method for monitoring according to an exemplary embodiment. In the following description, the same details as those of FIGS. 1 to 5 are not described.

Referring to FIG. 6, in operation S510, the controller 310 may display images, received from the image devices 100, in a first region of the display 320.

Moreover, in operation S520, the controller 310 may display information (type, the presence of connection, etc.) about the image devices 100 for displayed images, in a second region of the display which is different from the first region.

Furthermore, when an event occurs and detected from images which are being displayed in the first region, the controller 310 may display log icons, including information about the event, in a third region of the display 320 which is different from the first and second regions in operation S530. Here, a log icon includes a thumbnail image at a time when an event occurs, the type of an event, and text information (an event occurrence position, an event occurrence time, and the type of a device) about the event. As described above, event information is intuitively confirmed by displaying a log icon which includes a thumbnail image at a time when an event occurs, the type of the event, and text information about the event.

Figure 7:
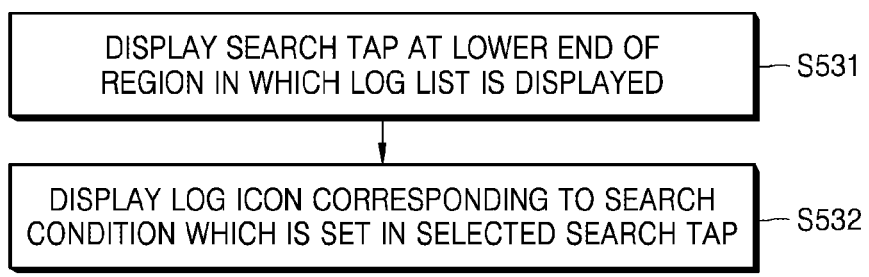
FIG. 7 is a flowchart illustrating a method of displaying a log icon based on selection of a search tab, according to an exemplary embodiment.

FIG. 7 is a flowchart illustrating a method of displaying a log icon based on selection of a search tab, according to an exemplary embodiment. Referring to FIG. 7, in operation S531, the controller 310 of the central management equipment 300 may display at least one search tab at a lower end of the third region.

When a tab among a plurality of tabs is selected, the controller 310 may display at least one log icon corresponding to a search condition which is set in the selected search tab, in operation S532. For example, in FIG. 3, when a "real-time event" tab is selected, the controller 310 may display, in real time, at least one log icon for at least one image from the devices 100. When a "DVR" tab is selected, the controller 310 may display at least one log icon for at least one image transmitted from the DVR 130.

Figure 8:
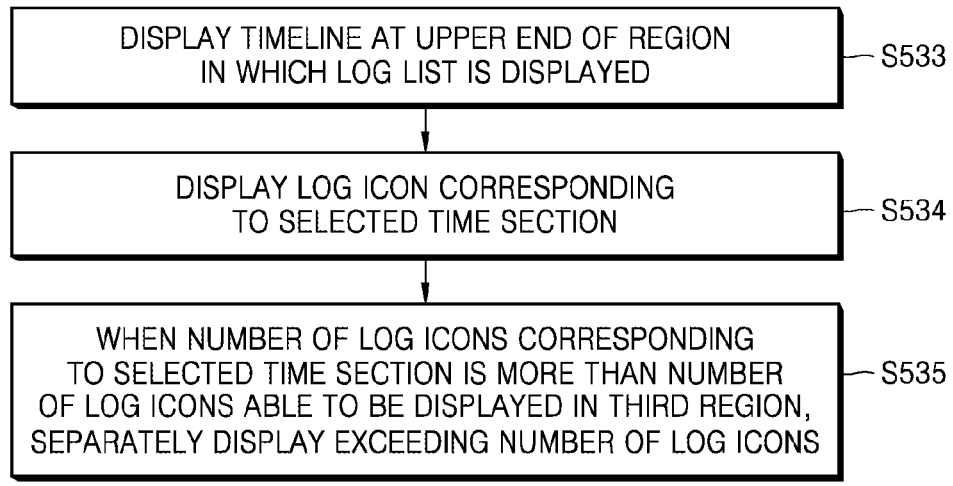
FIG. 8 is a flowchart illustrating a method of displaying a log icon based on selection of a time section, according to an exemplary embodiment.

FIG. 8 is a flowchart illustrating a method of displaying a log icon based on selection of a time section, according to an exemplary embodiment. Referring to FIG. 8, in operation S533, the controller 310 of the central management equipment 300 may display a timeline at an upper end the third region.

When a time section is selected from the timeline by a user, the controller 310 may display, in the third region, at least one log icon corresponding to the selected time section in operation S534. At this time, the controller 310 may generate a delimiter, and provide the delimiter to an upper end of each of a rightmost log icon and a leftmost log icon among the displayed log icons. When a log icon is selected from among the plurality of log icons corresponding to the selected time section, the controller 310 may activate and display an event image matching a thumbnail image of the selected log icon, and deactivate and display unselected log icons. Here, a time section may be selected by dragging an input device on the timeline (for example, a mouse device), or may be directly input.

When the number of the log icons corresponding to the selected time section is more than the maximum number of log icons that can be accommodated in the third region, the controller 310 may separately display the exceeding number of the log icons, in operation S535. Referring to FIG. 4B, "+5" illustrated at the right end of the log list denotes that there are five log icons in addition to the log icons displayed, corresponding to the selected time section. When the controller 310 receives a corresponding number input signal or receives an arrow key input signal, the controller 310 may display the other five log icons 231 on a screen.

As described above, according to the above exemplary embodiments, event information is intuitively confirmed by displaying log icon information including even-related information, thereby enhancing security efficiency.

The above exemplary embodiments may also be embodied as computer readable codes on a computer readable recording medium. The computer readable recording medium is any data storage device that may store data which may be thereafter read by a computer system.

Examples of the computer readable recording medium include read-only memory (ROM), random-access memory (RAM), CD-ROMs, magnetic tapes, floppy disks, and optical data storage. The computer readable recording medium may also be distributed over network coupled computer systems so that the computer readable code is stored and executed in a distributed fashion. Also, functional programs, codes, and code segments for accomplishing the inventive concept may be easily construed by programmers of ordinary skill in the art to which the inventive concept pertains.

It should be understood that the exemplary embodiments described therein should be considered in a descriptive sense only and not for purposes of limitation. Descriptions of features or aspects within each embodiment should typically be considered as available for other similar features or aspects in other embodiments.

While various exemplary embodiments have been described with reference to the figures, it will be understood by those of ordinary skill in the art that various changes in form and details may be made therein without departing from the spirit and scope of the inventive concept as defined by the following claims.

What is claimed is:

1. A monitoring method comprising:
   receiving a plurality of images from a plurality of image devices, the plurality of image devices comprising a surveillance camera;
   displaying the images in real time in a first region of a display;
   displaying information about the image devices related to the images, which are being displayed in the first region, in a second region of the display which is different from the first region; and
   generating a plurality of log icons including event information when a predetermined event is detected from the images which are being displayed in the first region;

displaying the log icons on a timeline in a third region of the display, the third region being separated from the first and second regions; and in response to one of the log icons on the timeline being selected, displaying, within the selected log icon, an event image corresponding to the selected log icon in a reproducible state, and at least one of a speaker image indicating an audio event and a human image indicating a motion sensing event, while the images in the first region are being displayed in real time, wherein at least one of the images in the first region of the display is a real-time video image of a monitored area that is monitored by the surveillance camera, and the event image in the third region of the display is a previously recorded video image of the same monitored area, and wherein the real-time video image of the monitored area is continuously played in the first region of the display while the previously recorded video image of the monitored area is selected from the log icons and played in the third region of the display.

2. The monitoring method of claim 1, further comprising:
displaying at least one search tab, in which a search condition is set, near the third region; and
in response to selection of a search tab among the at least one search tab, displaying at least one log icon corresponding to the search condition which is set in the selected search tab,
wherein the displayed at least one log icon includes a thumbnail image and information about an event.

3. The monitoring method of claim 1, further comprising displaying the plurality of log icons other than the selected log icon in a deactivated state.

4. The monitoring method of claim 1, wherein, in response to a time section being selected from the timeline, displaying at least one log icon corresponding to the selected time section, and
wherein the monitoring method further comprises, if a number of the at least one log icon corresponding to the selected time section is more than a maximum number of log icons that can be accommodated in the third region, indicating a number of log icons that exceeds the maximum number.

5. The monitoring method of claim 1, further comprising:
displaying moving bars at a leftmost log icon and a rightmost log icon among the plurality of log icons displayed in the third region, and
displaying delimiters comprising a first delimiter at a leftmost log icon among the plurality of log icons in a selected time section and a second delimiter at a rightmost log icon among the plurality of log icons in the selected time section, in the third region.

6. A monitoring method comprising:
detecting occurrence of at least one event from a plurality of images received from a plurality of image devices, the plurality of image devices comprising a surveillance camera;
generating, from the images, a thumbnail image and an event image corresponding to a time of the occurrence of each of the event;
generating a log icon which includes the thumbnail image and event information corresponding to each of the event; and
displaying, on a timeline, a log list including the log icon corresponding to each of the event; and
in response to the log icon being selected, displaying, within the selected icon, an activated event image corresponding to the selected log icon in a reproducible state, and at least one of a speaker image indicating an audio event and a human image indicating a motion sensing event, while the plurality of images are being displayed in real time, wherein at least one of the plurality of images is a real-time video image of a monitored area that is monitored by the surveillance camera, and the activated event image is a previously recorded video image of the same monitored area, and wherein the real-time video image of the monitored area is continuously played while the previously recorded video image of the same monitored area is selected from the log list and played.

7. The monitoring method of claim 6, further comprising, in response to the log icon being selected, and displaying unselected log icons in a deactivated state.

8. The monitoring method of claim 6, further comprising:
displaying a condition search tab in the display;
in response to selection of the condition search tab, displaying a menu which includes at least one search condition to be selected; and
in response to selection of one of the at least one search condition, displaying a log list including at least one log icon corresponding to the selected search condition.

9. The monitoring method of claim 8, wherein the search condition comprises at least one of a place of the event, a type of the event, and a plurality of devices providing the plurality of images corresponding to respective events.

10. The monitoring method of claim 6, further comprising:
in response to selection of a time section from the timeline, displaying at least one log icon corresponding to the selected time section.

11. The monitoring method of claim 6, further comprising, in response to the log icon being selected, deactivating other log icons on the display.

12. The monitoring method of claim 10, further comprising, if a number of the at least one log icon corresponding to the selected time section is more than a maximum number of log icons that can be displayed in the display, indicating a number of log icons that exceeds the maximum number in the display.

13. A monitoring system comprising:
a surveillance camera that monitors an area;
a processor configured to detect occurrence of at least one event from a plurality of images, generate, from the plurality of images, a thumbnail image and an event image at a time of the event occurrence, and generate a first log icon which includes the thumbnail image and information about the event; and
a display configured to display a log list including a plurality of log icons on a timeline, the plurality of log icons including the first log icon,
wherein the processor is further configured, in response to the first log icon being selected, control the display to display, within the selected first log icon, an event image corresponding to the selected first log icon in a reproducible state, and at least one of a speaker image indicating an audio event and a human image indicating a motion sensing event, while the plurality of images are being displayed in real time,
at least one of the plurality of images is a real-time video image of the monitored area, and the event image is a previously recorded video image of the same monitored area, and wherein the real-time video image of the monitored area is continuously played while the previously recorded video image of the same monitored area is selected from the log list and laved.

14. The monitoring system of claim 13, wherein the processor is further configured to control the display to display the plurality of log icons other than the selected first log icon in a deactivated state when the first log icon is selected.

15. The monitoring system of claim 13, wherein the display is configured to display a condition search tab,
wherein, in response to selection of the condition search tab, the processor controls the display to display a menu which includes at least one search condition to be selected,
wherein, in response to selection of one of the at least one search condition, the processor controls the display to display a log list including at least one log icon corresponding to the selected search condition.

16. The monitoring system of claim 13, wherein the display is configured to display a timeline,
wherein, in response to selection of a time section from the timeline, the processor controls the display to display at least one log icon corresponding to the selected time section.

17. The monitoring system of claim 16, wherein if a number of the at least one log icon corresponding to the selected time section is more than a maximum number of log icons that can be accommodated in the display, the processor indicates a number of log icons that exceeds the maximum number in the display.

* * * * *